United States Patent
Heintzmann et al.

(10) Patent No.: US 11,885,948 B2
(45) Date of Patent: Jan. 30, 2024

(54) METHOD AND SYSTEM FOR GENERATING A LIGHT FIELD WITH MULTIPLE LOCALIZED NULL POINTS

(71) Applicant: Leibnitz-Institute für Photonische Technologien e.V., Jena (DE)

(72) Inventors: Rainer Heintzmann, Jena (DE); Alexander Jügler, Jena (DE)

(73) Assignee: Leibnitz-Institute für Photonische Technologien e.V., Jena (DE)

( * ) Notice: Subject to any disclaimer, the term of this patent is extended or adjusted under 35 U.S.C. 154(b) by 0 days.

(21) Appl. No.: 17/787,738

(22) PCT Filed: Dec. 16, 2020

(86) PCT No.: PCT/EP2020/086368
§ 371 (c)(1),
(2) Date: Jun. 21, 2022

(87) PCT Pub. No.: WO2021/122706
PCT Pub. Date: Jun. 24, 2021

(65) Prior Publication Data
US 2023/0280573 A1    Sep. 7, 2023

(30) Foreign Application Priority Data
Dec. 19, 2019    (DE) ................. 10 2019 135 033.6

(51) Int. Cl.
*G01N 21/64* (2006.01)
*G02B 21/00* (2006.01)
(Continued)

(52) U.S. Cl.
CPC ..... *G02B 21/0032* (2013.01); *G01N 21/6458* (2013.01); *G02B 21/0076* (2013.01); *G02B 21/16* (2013.01); *G02B 21/365* (2013.01)

(58) Field of Classification Search
CPC ................... G01N 21/6458; G02B 21/365
See application file for complete search history.

(56) References Cited

U.S. PATENT DOCUMENTS

| 10,962,479 B2 | 3/2021 | Balzarotti et al. |
| 2009/0195857 A1 | 8/2009 | Branson et al. |
| (Continued) | | |

FOREIGN PATENT DOCUMENTS

| DE | 10 2011 055367 A1 | 5/2013 |
| DE | 10 2016 119 262 A1 | 4/2018 |
| (Continued) | | |

OTHER PUBLICATIONS

International Search Report and Written Opinion for International Patent Application No. PCT/EP2020/086368 dated Apr. 20, 2021 (w/English translations).

*Primary Examiner* — David P Porta
*Assistant Examiner* — Shun Lee
(74) *Attorney, Agent, or Firm* — Hunton Andrews Kurth LLP

(57) ABSTRACT

The present disclosure relates to a method and system for generating a light field in a specified working region using an at least partly coherent light source. For example, light from the light source can be fed to at least one modulator which causes different changes in at least one property of the light in different components of the light. The modulator can be actuated with a null point actuation pattern such that the sum of the amplitude distributions of the light components guided via the modulator has null points at at least two positions which can be specified independently of each other in the working region. Each null point adjoining a respective region in which the sum of the amplitude distributions can differs from null. The light can be guided from the modulator into the working region.

23 Claims, 7 Drawing Sheets

Figure 1:
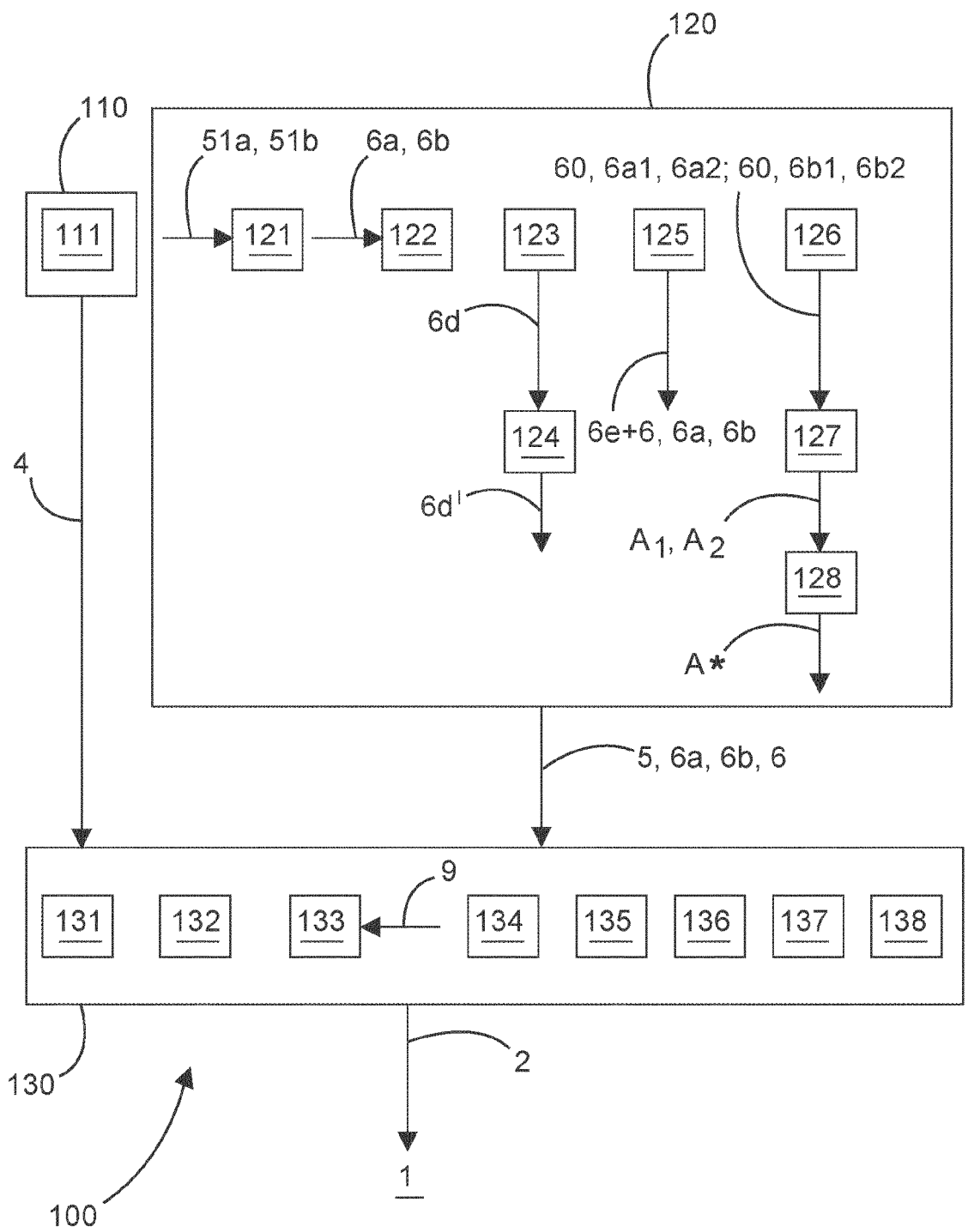

(51) Int. Cl.
*G02B 21/16* (2006.01)
*G02B 21/36* (2006.01)

(56) References Cited

U.S. PATENT DOCUMENTS

| | | |
|---|---|---|
| 2009/0310206 A1 | 12/2009 | Gluckstad |
| 2014/0042340 A1 | 2/2014 | Hell |
| 2019/0212544 A1 | 7/2019 | Herber et al. |
| 2019/0235220 A1* | 8/2019 | Balzarotti .......... G01N 21/6428 |

FOREIGN PATENT DOCUMENTS

| | | |
|---|---|---|
| WO | 2013003485 A1 | 1/2013 |
| WO | 2013167479 A1 | 11/2013 |

* cited by examiner

METHOD AND SYSTEM FOR GENERATING A LIGHT FIELD WITH MULTIPLE LOCALIZED NULL POINTS

CROSS REFERENCE TO RELATED APPLICATION(S)

This application relates to, and claims the benefit and priority from International Patent Application No. PCT/EP2020/086368 filed on Dec. 16, 2020 that published as International Patent Publication No. WO 2021/122706 on Jun. 24, 2021, which claims the benefit and priority from German Patent Application No. 10 2019 135 033.6 filed on Dec. 19, 2019, the entire disclosures of which are incorporated herein by reference.

FIELD OF THE DISCLOSURE

The present disclosure relates to a method and system for generating a light field which has defined zeros at specified position in a defined work region.

Background Information

Fluorophores or other point emitters can be located in a work region, for instance on a sample to be examined, using their secondary light (e.g., luminescence). If a point emitter is irradiated by excitation light of a suitable wavelength, it in turn emits secondary light (scattered light of the same wavelength or luminescent light of a different wavelength). However, if the light field of the excitation light now has a zero located exactly at the position of the point emitter, then the point emitter emits no or minimal secondary light. In this context, a zero is understood to be a clear local intensity minimum. It is thus possible to localize a point emitter by sequentially scanning an extensive sample while monitoring the intensity of the secondary light. A corresponding method is known from (F. Balzarotti et al., "Nanometer resolution imaging and tracking of fluorescent molecules with minimal photon fluxes", Science 355, 606-612 (2017)). A modification of this method is known from DE 10 2016 119 262 A1.

Problem and Solution

A problem addressed by the present invention is that of providing a method with which a work region can be subjected to a light field which has a plurality of zeros that are positionable independently of one another in the work region. A further problem addressed by the present invention is that of providing a method with which a plurality of point images can be simultaneously localized and/or tracked in an extensive work region.

These problems are solved by a method for generating a light field as claimed in the main claim and by a method for localizing and/or tracking point emitters as claimed in the alternative independent claim. Further advantageous embodiments arise from the dependent claims referring thereto.

DISCLOSURE OF THE INVENTION

A method for generating a light field in a specified work region by means of an at least partly coherent light source was developed within the scope of the invention. In particular, the coherent light source can be a laser for example. However, partly coherent light, for example from a lamp with a color filter or from light-emitting diodes (LEDs), is also suitable to this end. Light from the light source is fed to at least one modulator so that the modulator impresses different changes in at least one property of the light on different components of the light. Examples of such properties include the phase, the polarization, and the intensity of the light. The light is subsequently guided into the work region. By way of example, the work region can be the sample plane or image plane in a microscope. The modulator is controlled by a zero control pattern, in such a way that the summation of the amplitude distributions of the light components guided via the modulator has zeros at at least two positions that a specifiable independently of one another in the work region. Each of these zeros adjoins regions in which said summation of the amplitude distributions differs from zero. In this case, a delimited local intensity minimum is referred to as a zero. Here, this zero may be delimited in one spatial direction, or else in two or three spatial directions, and is then referred to as a 1-D zero, 2-D zero, or 3-D zero.

In particular, a zero can be understood to mean, for example, a location in the light field at which an intensity near zero that is as low as possible is generated, even if an actual zero cannot be obtained in practice. Thus, in particular, a sharply delimited 1-D/2-D/3-D zero can denote for example an intensity curve with a local minimum, which has significant curvature in one, two, or three spatial directions.

By way of example, a significant curvature can in particular be understood to mean that a significant increase in the illumination intensity, which is detectable or usable for measurements, is obtained at a given distance, for example $\lambda/5$ (or less), from the zero. In this case, a significant increase can in particular be understood to mean for example that, at the given distance from zero, the illumination intensity has increased by at least 3% of the highest maximum closest to the zero (both sides of the zero) in relation to said zero.

Constructive or else destructive interference between the components of the light can be set by way of the different changes, for example phase changes, which are experienced by these various components of the light. Since the light is at least partly coherent, this phase relationship, and hence also the interference, remains constant on the path between the modulator and the work region. Thus, if any desired number of zeros are required at certain locations in the work region, it is possible, for example by way of a parameterized formulation, to calculate a zero control pattern which meets these requirements. In this case, the modulator can be placed in any optical playing in relation to the work region. By way of example, these optical planes are planes which are conjugate to the work region and which are referred to as image planes below, or planes which have a Fourier relationship (Fourier transform) in relation to the image plane and which are referred to as Fourier planes below. The Fourier planes are the conjugate planes of the back focal plane (considered for the emission light, that is to say the front focal plane of the imaging illumination system) of an optically imaging system. However, all further positions of the modulator outside of the denoted planes are conceivable. All that is decisive is the correct choice of the zero control pattern in accordance with the chosen optical plane.

Precisely as a result of the possibility of generating zeros at a plurality of positions that are specifiable independently of one another, the method proposed here differs from other methods which for example generate a spatial pattern of the zeros with a fixed periodicity, as occurs, for example, in the structured light method or else in SIMFlux.

In this case, the accuracy with which the zeros can be positioned in the work region is not restricted by the spatial resolution with which the zero control pattern can be generated in the modulator. The reason for this is that, in addition to a spatial distribution of the regions which change the phase of the light incident on the modulator, the zero control pattern also has as additional degree of freedom the respective local absolute value of this phase change. Although the phase resolution with which the phase can be altered is likewise subject to technical restrictions in most modulators, it is sufficient to increase the positioning accuracy significantly over the measure provided by the pixelation of the modulator on its own, which arises for the distribution of the zeros by a pixel-accurate shift of a zero control pattern on a modulator that has been subdivided into pixels.

The light field generated according to the invention is particularly advantageous for working with fluorophores or other point emitters on an extensive sample, which forms the work region. By way of a plurality of zeros that are able to be positioned independently of one another, it is possible to localize and/or track a plurality of the point emitters which are situated in the vicinity thereof. This saves a great amount of measurement time and facilitates the simultaneous measurement of dynamics of a plurality of moving point emitters in relation to a measurement in which a measurement is carried out using only a single zero, for example by virtue of a single zero being scanned over the sample. In this case, excitation is understood to mean subjecting the point emitter to that light from the light source which causes this point emitter to emit scattered light, luminescent light or other secondary light. What can be achieved by exploiting special properties of some types of point emitters, for example of fluorophores such as Alexa Fluor® 647 or PAmCherry, is that the point emitters only emit secondary light in sparse/optically isolated fashion even in the case of a high point emitter density, hence making localizing or tracking the position particularly easy. In this case, this optical isolation of the tightly packed point emitters is facilitated by a preceding activation of sparse point emitters in a stochastic manner over the area of the extensive sample. Only activated point emitters can then be excited to emit secondary light. In this case, sparse/optically isolated point emitters is understood to mean that no further excitable point emitters of the same type of present within a minimum distance to the next point emitter. In this case, this minimum distance defines the minimal distance between two point emitters for which the secondary light emitted thereby can be captured separately; this is often also referred to as the limit of resolution. This minimum distance is observed if the distance is at least equal to the diffraction limit at the wavelength of the secondary light of the point emitters.

When scanning a single zero which is surrounded by regions with a non-zero intensity, by contrast, there is a comparatively high probability of activating a plurality of point emitters simultaneously in these regions, which point emitters have to be removed from the test series again, or the activation process must be separated from the actual localization process.

The normal control electronics of the modulator still a sufficient to generate the zeros. Commercially available optical elements such as lenses, masks, aperture stops and mirrors may however be deliberately placed downstream of the modulated light field, up to the work region, in such a way that these optical elements still influence the obtained zeros, or the light field in general, in the work region in calculated fashion. Starting from the desired positions of the zeros, the suitable zero control pattern can be calculated using a commercially available computer.

In this case, it is not necessary to use only a single modulator; instead, the modulation can also be split among a plurality of modulators, or one or more modulators and additional optical elements. By way of example, modulators may have conflicting goals of, firstly, a phase resolution that is as good as possible and, secondly, a fast response time.

By way of example, it is possible to use a first modulator to place zeros slowly, but with a high accuracy, on the work region. A second optical element, which could also be a modulator, can then be used to quickly change the position of the zeros by small absolute values in order to improve the accuracy of the position estimate by measuring only a few photons of secondary light emitted from the work region. Advantageously, this fast change in position can be implemented using technical means that are separate from the means used for the slow shift. By way of example, use could be made of resonant or non-resonant galvanometer mirrors or digital micromirror devices, but also of other means which are suitable for simultaneously shifting an image. Examples of this include a vibratingly rotating glass plate, a vibrating shift of the modulator, or the like.

For quickly changing the zero position without changing the zero control pattern, mechanically interchangeable glass plates of different thicknesses, but with the same alignment angle could be positioned (for example in a wheel similar to a filter wheel) downstream of the modulator (or in a conjugate plane) so that the light is subject to a different parallel offset in each case. By way of a suitable different glass thickness, this parallel offset can be chosen precisely in such a way that the zeros in the work region (sample plane) are shifted over a selectable distance, for example in the low 10 nm range (or less).

Instead of the interchangeable glass plates, use can for example also be made of an optical device in which a glass plate, for example a plane glass plate, can be adjusted about a definable angle relative to the optical axis (see the realization for example in the "ApoTome" product by Zeiss). In a particularly advantageous embodiment, a plane glass plate rotates a constant angle $\alpha$ with respect to the optical axis about the optical axis with an angle $\phi(t)$. As a result, it is possible to generate a global offset of all zeros that were generated previously by way of the modulator. By way of example this can be used in such a way that, in a first localization step, a plurality of zeros are positioned as accurately as possible on the fluorophores and then all zeros are offset by the same absolute value. In addition to a faster localization without a more complex feedback, what is also advantageous is that, for the subsequent determination of position, the same zero profile can be expected for each particle.

Additionally, a first modulator can be used to generate intensive, locally restricted light patterns on the second modulator, with the second modulator then impressing the zero and the precise shift on this light. As a result, the available light can be distributed efficiently among a plurality of such zeros.

A modulator with a plane active surface is chosen in a particularly advantageous embodiment. This modulator is designed to impress phase changes on light components that pass through the active surface and/or are reflected by the active surface. By way of example, the modulator can be a phase spatial light modulator (phase SLM) in particular. This phase SLM can only change phases of the light field, but not its amplitudes (or intensities). The desired positions of the zeros in the work region can then be translated into locations on the active surface, at which the phase of the light should be altered in each case, and absolute values, by means of which the phase should be changed in each case.

In a particularly advantageous embodiment, the zero control pattern consists of any number of zero control sub-patterns, which each can generate one or more (for instance two) independent zeros by virtue of the light field being able to be influenced in different ways. The zero control sub-patterns can in turn consist of zero control sub-sub-patterns, which should be considered to be parts of the control sub-patterns. The control sub-patterns may—but need not—be based on the same basic patterns. In this particularly simple embodiment, it is then for example possible to change certain parameters of the zero control sub-sub-patterns in order to control the respective zeros independently of one another. For the sake of clarity, the term "control sub-pattern" is used synonymously with the term "zero control sub-pattern" below. Furthermore, the term "control sub-sub-pattern" is used synonymously with the term "zero control sub-sub-pattern" below.

In a particularly advantageous embodiment, at least two adjoining regions of the above-described, phase-changing active surface, which may be situated in the image plane for example, are controlled in such a way that, between the light components on which these regions respectively act, a mean phase shift of t is set for the light leaving these regions. By way of example, these adjoining regions can each correspond to zero control sub-sub-patterns. In the case of inhomogeneous illumination, the means of the phase shift can be weighted, in particular, by the amplitude of the illumination. Light components from the adjoining regions can then interfere destructively with one another, as a result of which a zero crossing of the amplitude of the light, and hence a tightly delimited zero (local minimum) arises in the sample. The desired positions of the zeros in the work region can be translated into positions of the adjoining regions on the active surface, which should be controlled for generating these zeros, in comprehensible fashion using means from ray optics. It should be mentioned here that the sizes of the zeros generally do not correspond to the size of the zero-generating regions. The embodiment of the zero-generating regions is more decisive, it for example having an influence on the spatial directions in which the zero is delimited.

In particular, the active surface of the modulator can for example be subdivided into pixels which are separately controllable from one another. These pixels can then serve as the building blocks for generating any desired zero control pattern.

By way of example, if adjoining regions, for example rectangular regions, on an active surface subdivided into pixels are controlled in such a way that a phase shift of $\pi$ is set between the light components influenced by these regions, the two rectangles advantageously together form a further rectangle, the side lengths corresponding to an even number of pixels, for example 6×10 pixels. This specific zero control sub-pattern with its two rectangles as zero control sub-sub-pattern is referred to as a "phase box" below. The algorithms for calculating the positions of the rectangular regions from the desired positions of the zeros then become particularly simple. The same applies if the regions are not rectangular but, for example, round (for instance circular) with point symmetry in relation to a center. By way of example, circular regions may be inscribed in a square of 11×11 pixels. As a result of an address structure, often present on phase SLMs, with the distance of two pixels in each case, other box sizes may also be particularly advantageous. It may also be advantageous to choose an odd number of pixels as an edge length and, for example, deliberately leave the center unmodulated. It may also be advantageous to combine even and odd edge lengths.

In a particularly advantageous embodiment, the positions of the zeros are specifiable with a better accuracy than what is defined by the shift of the zeros that would arise by translation in at least one coordinate direction of the zero control pattern by one pixel on the active surface of the modulator. As explained above, other degrees of freedom (for instance, the introduction of gratings with a phase angle that is adjustable by the phase change, which gratings lead to a change in amplitude of the light reflected directly in the zeroth order by the box) can be used to this end, which degrees of freedom are not directly coupled to the resolution of the pixels of the active area.

In a particularly advantageous embodiment, the modulator is controlled using a first zero control pattern at a first time and at least one second zero control pattern at a second, later time. In this case, the at least two zero control patterns differ to the effect of the position of at least one zero changing in the work region by a smaller absolute value than the change that would arise from the translation of the first zero control pattern by one pixel on the active surface of the modulator.

Thus, the zeros can be shifted by sub-pixel absolute values in the work region, measured in terms of the shift of the zero that is obtained by shifting the modulator pixel relevant to this end by exactly one pixel. Accordingly, it is possible to significantly increase the accuracy with which for example point emitters can be tracked in the work region. By way of example, the intensity of secondary light which the point emitters emit as a consequence of an excitation by the light field generated by the modulator can be monitored as tracking feedback. A point emitter is only not excited (or only minimally excited) to emit secondary light whenever it is covered by exactly one zero of the light field in the work region. In the case of a relative shift between zero and point emitter of, e.g., 1 nm, significantly more measurable light is already emitted, from which the distance to the zero can be deduced.

In a further particularly advantageous embodiment, at least one zero control sub-pattern of the zero control pattern is composed of the superposition of at least two zero control sub-sub-patterns or composed in any other way. The light that is influenced by each of these zero control sub-sub-patterns generates a respective complex amplitude at the specified location of at least one zero. Now, the control sub-sub-patterns are chosen in such a way that the superposition of these complex amplitudes at the specified location of the zero yields zero or a minimum in terms of absolute value that is near zero.

In this way, a zero control sub-pattern which supplies a zero at a specific specified location can be generated particularly easily when starting from the desire to generate a zero at said location. In particular, the position of the generated zero can be shifted in controlled fashion by changing the complex amplitudes of the light field by means of the zero control sub-sub-pattern.

In a further particularly advantageous embodiment, at least one zero control sub-pattern is composed of the superposition of at least three control sub-sub-patterns or composed in any other way. The light that is influenced by each of these control sub-sub-patterns generates a respective complex amplitude at the specified location of at least one zero. Now, the control sub-sub-patterns are chosen in such a way that the superposition of these complex amplitudes generates at least two zeros in the work region. Using such an arrangement, it is possible for the two zeros to be shifted independently of one another by sub-pixels absolute values and also to be brought to within a very small distance from one another.

To facilitate a simple shift of the zeros, at least one control sub-sub-pattern advantageously contains an additional control element in the plane of the active surface, said additional control element being suitable for influencing the amplitude, generated by this control sub-sub-pattern, at the specified location of the zero. By way of example, this control element can be a periodic component of the control sub-sub-pattern or a Fresnel zone plate with an adjustable focal length. By way of example, in the case of the phase-changing modulator, the latter can be implemented by the addition of a Fresnel zone plate ("Fresnel lens") to at least one zero control sub-sub-pattern. By adjusting the focal length of the Fresnel lens, an additional focus or defocusing term is impressed on the departing light field from this control sub-sub-pattern, leading to the possibility of influencing the amplitude generated at the specified location of the zero. However, this influence on the generated amplitude at the specified location of the zero can also be implemented by the addition of a suitable periodic pattern, for example a grating, from which only some of the diffracted light (e.g., only the zeroth order) reaches the plane of the zeros to be generated. The change in the amplitude of the light of one (or more) of the control sub-sub-pattern leads to a sub-pixel shift in the zero. Optionally, not precisely suitable phases of the light of the control sub-sub-patterns at the desired zero position can be compensated by additionally impressed offset phases in the control sub-sub-patterns.

In a particularly advantageous embodiment, a phase SLM, with which it is only possible to change the phases of the light field, is used as a phase-changing light field modulator. However, so that the intensities (or amplitudes) can also be changed using the phase SLM—which is not readily possible from a structural point of view—a low-pass filter is integrated into the beam path, or the low-pass filter-property of an available optical component (e.g., of the microscope objective) is used to this end. By way of example, an aperture stop, a pupil stop or a mask in the Fourier plane of an optical system come into question as a low-pass filter in this case. Then an additional grating is generated, for example in both halves of the phase box. Since the additional grating has been chosen to be of such high frequency that its diffracted light is blocked by the low-pass filter and hence the amplitude removed from the imaging by the grating does not contribute to the image of this part of the box in the sample, it is possible, for example by way of a symmetrically designed phase of the grating (+/− phase value P), to in each case independently control the amplitude of the image of each part of the phase box in the image plane by way of the choice of the phase value P.

In practical terms, this then means that a greater relative difference in the phase values+/−P (modulation depth) of the additionally applied grating causes more light from this region of the phase box to be blocked overall in the case of otherwise unchanged conditions.

To increase the zero quality in the case of the sequential 2-D localization, for example by rotating the zero control pattern in the image plane through 90°, it is advantageous to likewise turn the polarization of the light upstream of the objective so that it remains azimuthal. Both active optical elements (e.g., liquid crystal modulators, electro-optic modulators or motor-driven half-wave plates) and passive optical elements (e.g., a segmented half-wave plate in the Fourier plane) lend themselves to this end.

By way of changing the relative overall phase and the above-described grating modulation depth between the two halves of the "phase box", it is possible to shift the zero from the original position with sub pixel accuracy but nevertheless qualitatively maintain a deep (numerically close to zero) and "sharp" (a high maximum in the vicinity) zero. However, in practical terms this often means that an exact 0-ϕ phase difference between the two halves of the box is no longer observed in the case of a sub-pixel-shifted zero, and so this 0-π phase difference then arises at the desired sub-pixel position and, at the same time, the respective amplitudes of the contributions of the respective halves are adapted in such a way there that they interfere destructively and consequently yield a zero.

To keep the positioning algorithm simple, it may be advantageous to always provide one half of the phase box with a fixed grating and a fixed mean phase, while only the other half of the box varies the grating modulation depth (+/−P) and relative phase F in comparison with the mean phase of the other "phase box".

Since there often are technical limits placed on the phase SLM as a result of its pixelation and also as a result of the obtainable phase graduation (e.g., 8 bit), it may however also be advantageous, in particular, to vary both P and F on both sides of the phase box. Simulations and/or calibration solutions allow optimal values to be determined for sub-pixel shifts while maintaining a zero that is as good as possible, and said values can then also be used within the meaning of a "lookup" table.

As a result of additional modulation with the grating it is possible to shift the positions of zeros, in particular in one linear direction. To control the positions of zeros in two-dimensional fashion, a new pair of zero control patterns may be generated for the second direction, said new pair being rotated through 90° in relation to the zero control patterns used for the first direction.

However, it is also possible for example to use zero control sub-patterns which, for instance, consist of four parts and generate a local minimum that is locally tightly delimited in two dimensions. Analogous to what was described above, the individual parts of this pattern can be modulated using a grating or any other periodic pattern in order to control the position of the zero in two dimensions, in each case with sub-pixel accuracy.

Even in the case where two patterns are used, the zero control sub-patterns may have many different identical shapes (e.g., semicircles, triangles) or else different shapes. In particular, different shapes or sizes may also be advantageous means for influencing the respective amplitude, and consequently can be used to monitor the zero position.

To obtain a tightly delimited local minimum along the optical axis, it is possible to construct and the zero control sub-pattern, for example the above-described phase box, with an inner and an outer region. These regions may interact to generate a sharp minimum along the optical axis. The above-described principle for adjusting the amplitude at the specified location of the zero can equally be applied to these regions in order to be able to control the positions of the zeros with sub-pixel accuracy. The principle can be generalized in order also to generate zeros that are sharply delimited in two or three dimensions.

For instance, it is possible to create zero control sub-patterns, which, e.g., consist of four zero control sub-sub-patterns and which generate a zero that is tightly delimited in two dimensions. By way of a principle analogous to the described principle with rectangular "phase boxes" for creating one-dimensional zeros, it is then also possible to control the two-dimensional position perpendicular to the optical axis with sub-pixels accuracy.

By combining the above-described zero control sub-patterns, it is thus possible to implement the generation of the zeros in all three spatial directions (X, Y, Z) in analogous fashion. Thus, control about the zero in all spatial directions can be obtained individually, sequentially combined or simultaneously in all possible combination options (XY, XZ, YZ or XYZ). In this case, the "Z" spatial direction is parallel to the optical axis. The "X", "Y", and "Z" spatial directions are all perpendicular to one another. The aforementioned spatial directions are expressible by Cartesian unit vectors which are perpendicular to one another and therefore also linearly independent.

Furthermore, it is possible to create zero control sub-patterns with a plurality of zero control sub-sub-patterns, which each generate more than one zero in the work region. Then, these zeros may also be within the minimum distance within which the point emitters a considered to be optically isolated. By way of example, to generate two 1-D zeros, it is possible to choose a zero control sub-pattern in a phase-changing modulator, said zero control sub-pattern consisting of three control sub-sub-patterns. By way of example, these three control sub-sub-patterns are composed of rectangular regions which each have an edge length of 6×10 pixels, and so an edge length of 18×10 pixels then is obtained for the entire rectangular zero control sub-pattern. These control sub-patterns are chosen in such a way that adjoining rectangular regions are controlled in such a way that a phase shift of $\pi$ sets-in between the light components influenced by these regions. In a manner analogous to the "phase a box", other edge lengths or different sizes of the control sub-sub-patterns may be advantageous. Likewise in a manner analogous to the "phase box", the positions of the zeros can be placed with sub-pixel accuracy by changing the amplitude by way of a corresponding element in at least one of the zero control sub-sub-patterns. Should the zero positions be changeable independently of one another in the presented example, it would be possible, for example, to add independently controllable elements for changing the amplitude, for example a Fresnel lens or a periodic pattern, in the two non-adjoining regions of the zero control sub-pattern. All other thoughts regarding the generation and optimization of the generation of a zero apply analogously in respect of the generation of a plurality of zeros using a zero control sub-pattern.

It is also possible to determine the position of a plurality of emitters in 2-D from a plurality of measurements with 1-D zero patterns that are shifted and rotated relative to one another, in a manner analogous to tomographic methods (e.g., as in the case of computed tomography). An analogous statement also applies to 3-D position determinations, for example using 2-D zeros or else 1-D zeros.

In a further particularly advantageous embodiment, a zero can also be shifted with sub-pixel accuracy as follows:

A phase box A with a phase difference of $\pi$ between adjoining rectangular regions is positioned with pixel accuracy at one site using the modulator. If this phase box A is shifted in the plane by one pixel along or counter to the normal of the interface, a second phase box B arises, two rectangular regions with the phase difference of $\pi$ likewise adjoining one another in said second phase box. Consequently, the zero will also be shifted accordingly taking the imaging scale into account (if the influence of other phase boxes is neglected).

To now generate a zero control pattern whose zero position is located between the "extrema" specified by the phase boxes A and B, it is now possible to form a mean from the phase boxes A and B, in which these two phase boxes A and B are weighted relative to one another with a constant W.

In the regions where both phase boxes A and B have a phase of 0 or $\pi$, this new zero control pattern also has a corresponding phase of zero or t. In the one-pixel wide overlap region in the center, the phase shifts as a result of the weighted averaging by a value between 0 and $\pi$ in accordance with the value of the constant W. In the two edge regions respectively one-pixel wide, there is in each case a mixture of the respective control patterns of the phase boxes and the background, which may for example be occupied by the blocking control pattern.

The pattern arising over all initially leads to a deterioration in the zero quality. However, the zero quality can be restored for a specifically specified W. To this end, the region of the pattern in which the phase changes by 0 is provided with a first additional phase. Analogously, the region of the pattern in which the phase changes by $\pi$ is provided with a second additional phase. The two additional phases can now be optimized such that the illuminance in the zero, the position of which is specified by W, attains a minimum that is as small as possible. In this case, in particular, the second additional phase, for example, can be obtained by negating the first additional phase. However, the second additional phase may also be optimized independently of the first additional phase, further improving the zero quality.

The dependence of the first additional phase, or of the second additional phase, on W can be numerically determined, tabulated and optionally approximated by an algorithm. However, it can also be calculated theoretically. Once the additional phases have been defined, the position of the zero, which depends on W, can likewise be determined, tabulated and approximated by an algorithm (or theory). The aforementioned dependencies can be inverted such that, in that case, it is possible to determine the value of W and the values of the additional phases proceeding from a desired sub-pixel zero position. Hence, the weighted phase box control pattern, which has been corrected by the additional phases, is clearly described and defined.

In a particularly advantageous embodiment, a parameterized formulation is set up for the zero control pattern. The parameters of this formulation are optimized with the object of the summation of the amplitude distributions having zeros at the at least two specified positions. In this way, it is possible to substantially accelerate the search in particular for zero control patterns which do not merely consist of prefabricated "phase boxes". By way of example, the parameters can be the phase values to be found within an available control region on a light modulator. However, they may also relate to other values (e.g., significantly fewer values, for instance offset phase, place angle and modulation depth), from which it is then possible to determine the corresponding control patterns.

In a further particularly advantageous embodiment, the modulator is controlled by a superposition of a blocking control pattern and the zero control pattern. The blocking control pattern is used to substantially keep the light guided via the modulator away from the work region. Then, within the work region, the light field only has a noteworthy intensity in the direct vicinity of the zeros. This allows the light dose to which the work region is subjected overall to be limited. In this way, it is possible, in particular, to reduce for example an overall phototoxic load on a sensitive sample that forms the work region.

In particular, this blocking control pattern can for example be a high-frequency grating which is used to substantially keep the light guided via the modulator away from the work region. The mode of action is analogous to the above-described example where the phase box is overlaid with an additional grating. Since the applied blocking pattern has been chosen with such a high frequency within the meaning of a Schlieren optical unit, it can be blocked by an appropriate low-pass filter. In particular, low-pass filtering can be realized by for example an aperture stop or a Fourier mask in a Fourier plane between the modulator and work region. High-frequency light field components are thus suppressed. In this embodiment, the light field substantially has high frequencies in the respective surroundings of the zeros and in the regions of the blocking control pattern.

It may be advantageous to design the edges of at least one zero control pattern, zero control sub-pattern, or zero control sub-sub-pattern to have a soft transition to the adjoining blocking pattern. This can minimize unwanted edge phenomena, which could lead to a deterioration of the zero.

Advantageously, a ring aperture (bandpass filter) can be chosen as a Fourier mask. This allows reflections, for instance non-modulated reflections from the modulator, to be blocked. This contributes to obtaining a higher zero quality.

By way of example, the modulator can also be illuminated at an oblique angle and can be controlled so that the light components whose phase is not changed by a zero control sub-pattern are substantially kept away from the work region (e.g., by a stop or the aperture boundary). The phototoxic load on the work region can also be reduced in this way. In that case, the phase boxes contain a grating (e.g. a blazed grating), which is constituted in such a way that the light reaches the work region from there.

The light is modulated in a plurality of different optical planes in a further advantageous embodiment. By way of example, a plurality of modulators can be used to this end. It is also possible for example to use at least two parts of one modulator in different optical planes in combination with at least one additional optical element. The modulators or parts of modulators can then interact collaboratively, as has already been explained above.

In a further particularly advantageous embodiment, an optical plane in which the modulator is arranged is imaged with reduced size onto the work region or onto any other optical plane by means of an optical system. For a given spatial resolution of the controllable pixels on the active surface of the modulator, this then facilitates a positioning of the zeros in the work region with greater accuracy. Furthermore, the imaging optical system can for example guide the light field into the work region in such a way that the secondary light emitted by the work region as a consequence of an excitation by the light field is not shadowed by the modulator but can be guided to a detector.

In a further particularly advantageous embodiment, the work region and the modulator are arranged at optically conjugate positions and/or in optically conjugate planes. In this context, "conjugate" means, in particular, that an optical system imparts sharp image and between the affected (conjugated) positions/planes. In this way, the relationship between, firstly, the positions of the zeros in the work region and, secondly, the changes in the phase by the modulator required to generate these zeros is better manageable.

However, the modulator for example can also be placed in a Fourier plane. The relative position of the Fourier plane is defined by the specifically used optical system. By placing the modulator in the Fourier plane, it is possible to introduce changes in the phase by the modulator in the spatial frequency domain. The changes can be determined for example by a Fourier transform of the desired spatial distribution of the zeros in the work region, or else for example using iterative algorithms (for instance the Gerchberg-Saxton algorithm, or algorithms which find an optimum, e.g., in gradient-based fashion).

The placement in the Fourier plane is advantageous in that this allows the intensity available overall to be better utilized.

A modulator situated neither in the image plane nor in the Fourier plane may be advantageous. Thus, for example in the case of a phase-changing modulator, the available intensity of the light field can be used even better by a virtual shift of the modulator back into the image plane by means of the inclusion of additional focus terms. This only slightly increases the computational outlay for the zero control patterns since there is no need for time-consuming iterative algorithms for generating the zero control patterns, in particular during the application of the patterns.

The use of a static phase mask in combination with zero control patterns may be advantageous for the purposes of generating a "generalized phase contrast". A "generalized phase contrast" arises by the application of a phase mask in the Fourier plane.

Particularly advantageously, two modulators, or else two parts of the same modulator, may be arranged in different optical planes in relation to the imaging optical system. By way of example, the one modulator, or the one part of the modulator, can adopt the task of creating local intensity maxima in the vicinity of the desired positions of the zeros. The other modulator can then for example adopt the task of bringing the zeros to the desired positions with sub-pixel accuracy, and of optimizing the quality of the zeros. An advantage of this arrangement can be found in a very high light efficiency and the option of being able to individually control the curvature of the intensity distribution in the vicinity of the zero, which ultimately is related to the intensity in the vicinity of the zero.

A further embodiment variant consists of using two or more modulators, or two or more parts of one or more modulators, which are arranged in different optical planes in relation to the imaging system, so that a first number of modulators (or parts) pre-focus the light from the light source, for example into various partial beams. The remaining number of modulators (or parts) can then use the pre-focus light to generate the zeros, which are then delimited by stronger intensity maxima.

As explained above, a principal application of an arrangement of a plurality of zeros of the light field in the work region, which is positionable as desired, lies in the work with point emitters in this work region. Therefore, the invention also relates to a method for subjecting a work region containing point emitters to a light field which facilitates the excitation, localization, tracking or any other work with these point emitters.

At least two positions at which point emitters are located in the work region are obtained at least approximately within the scope of this method. By way of example, this can be implemented, in particular, by a preceding activation and localization of point emitters, for example by way of a model-based fit of the respectively emitted intensity distribution. Then, using the above-described method, the work region is subjected to a light field which has zeros at the previously obtained positions. In particularly advantageous embodiments, the point emitters are present sparsely—that is to say in optically isolated fashion. Should the point emitters not be optically isolated, the positions of the point emitters can for example nevertheless be obtained by zero control sub-patterns with which a plurality of zeros can be generated within the minimum distance for the point emitters to be optically isolated. Additionally, sufficiently many measurements with a shift of the zeros may also supply the necessary information. Additionally, it may be particularly advantageous to also use the image information.

As explained above, the positions of the point emitters initially only obtained approximately can be subsequently optimized by the option of shifting the positions of the zeros in the work region even with sub-pixel accuracy. Once the accurate positions of the point emitters have been found, the point emitters can be tracked independently of one another along their paths through the work region. The iterative optimization is particularly easy if it is possible to make the assumption that the emitters do not move or only move very little during the time for the optimization.

However, an optimization may also consider, in the model, the possible movement of the emitters during the optimization.

Therefore, in a particularly advantageous embodiment, the intensity (and optionally the spatial distribution) of secondary light emitted by the point emitters in response to an excitation using the light field is measured. By way of example, this facilitates the study of how well the point emitters can be excited by the light field at the given time. Additionally, the secondary light can also be used to localize the point emitters and track their movements.

In a further particularly advantageous embodiment, the positions of the zeros of the light field can be actively regulated such that the intensity of the secondary light adopts a minimum or the minimum is deliberately in the direct vicinity thereof, such that very accurate distance information to the zero can be obtained from the emitted light.

In particular, to this end, the positions of the zeros can be shifted with sub-pixel accuracy, as described above. In this case, in general, the rate of the respectively detected photons per unit time can be acquired as a function of the shift. The closer the zero is to the emitter, the more accurately each point emitter can ultimately be localized for a given illumination dose.

A further option consists of initially positioning at least two zeros at a respective reference point (assumed position of the point emitter) with sub-pixel accuracy and of shifting these zeros to at least three points at a fixed distance from the reference point with a relative angular distance that is as isotropic as possible (e.g., three steps with 120° relative rotation about the center of rotation). Then, the position of the point emitter can be fitted from the number of registered photons at the individual measurement points.

The choice of circular polarization for illuminating the work region may be advantageous in order to keep a dependence on the orientation of the molecule or, more precisely, of the transition dipole moment of the molecules small.

A combination of the two methods is also advantageous. For instance, the absolute values by which the zero is shifted starting from the reference point can be progressively reduced. By way of example, the position of the point emitter can then be fitted using a maximum likelihood estimation.

The method for determining the zeros can also be chosen in such a way that the zeros are iteratively repositioned in each step so that the result of the measurement (number or image of the emitted photons) in each case supplies maximum information (information capacity) in relation to the determination of the emitter position, leading to a particularly efficient determination of said emitter position.

In a further particularly advantageous embodiment, the work region is subjected to a plurality of light fields which each have zeros at different positions. The intensity of the secondary light and/or the spatial distribution of said intensity is measured for each of these light fields. The position of at least one point emitter in the work region is evaluated from the measurements. By way of example, if at least three light fields are chosen and the zeros of one light field in relation to another are in each case shifted in a plane, then a two-dimensional position of at least one point emitter can be evaluated from the measurements. In particular, the evaluation may for example contain a fit, for instance according to the maximum likelihood method.

At least four light fields are chosen in a further particularly advantageous embodiment. In this case, the union of the positions of the zeros from all light fields extends in the spatial directions. The evaluation, which in turn may contain a fit for example, can then supply the three-dimensional position of at least one point emitter.

In a further particularly advantageous embodiment, the work region is initially subjected to a first light field and the intensity of the secondary light and/or the spatial distribution of said intensity is measured. Following this measurement, a second light field which promises a maximum increase of information in respect of a given target is determined. By way of example, this given target may contain the accurate localization of at least one point emitter. The first light field and the second light field differ in particular in respect of the positions of the zeros contained therein. The work region is subsequently subjected to the second light field and the intensity or the spatial distribution of the intensity is measured once again.

SPECIFIC PART OF THE DESCRIPTION

Figure 2:
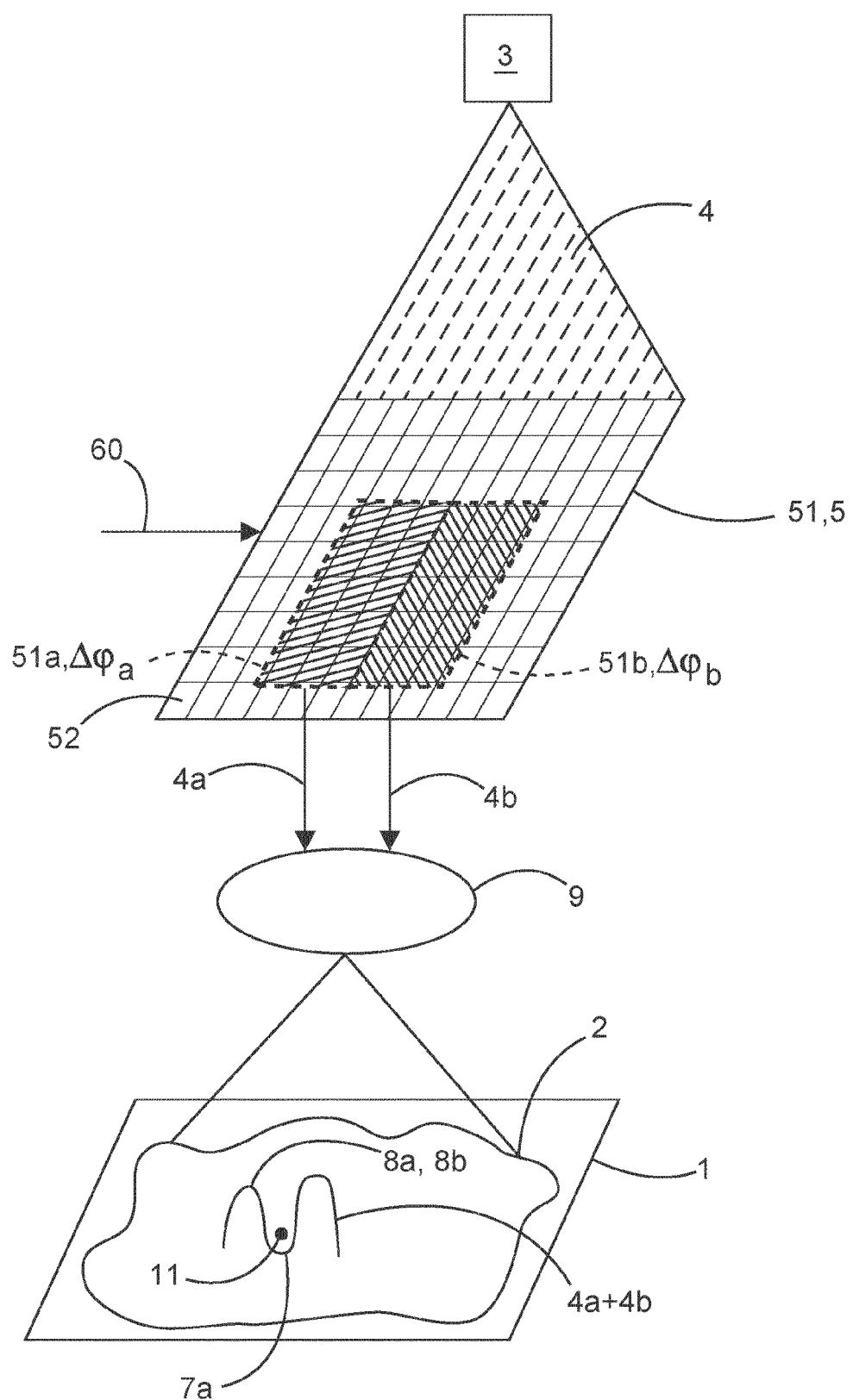
Figure 3:
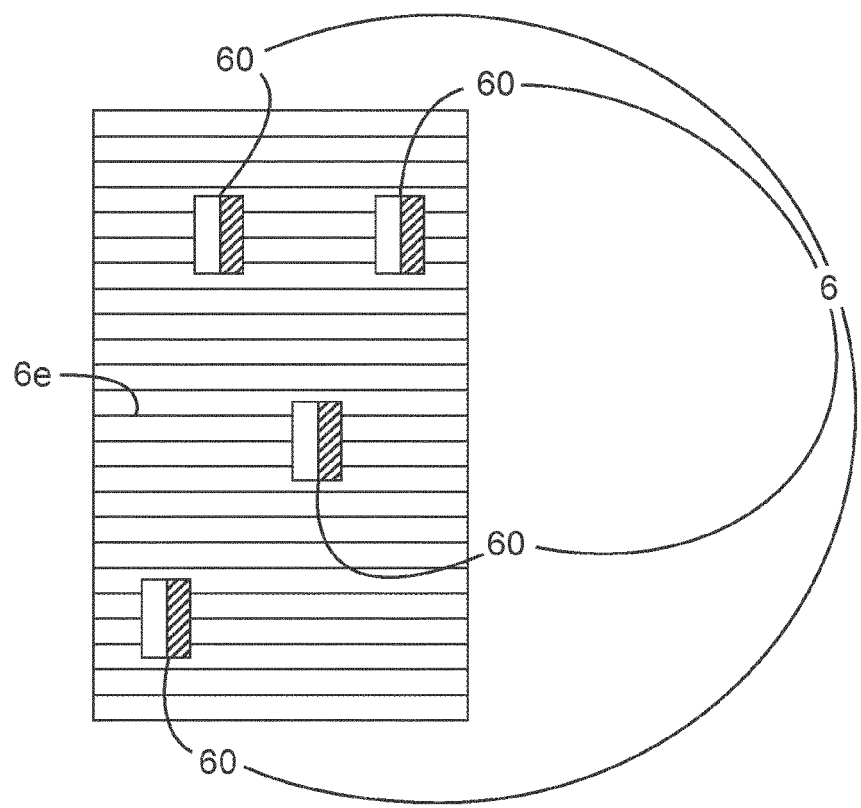
Figure 4:
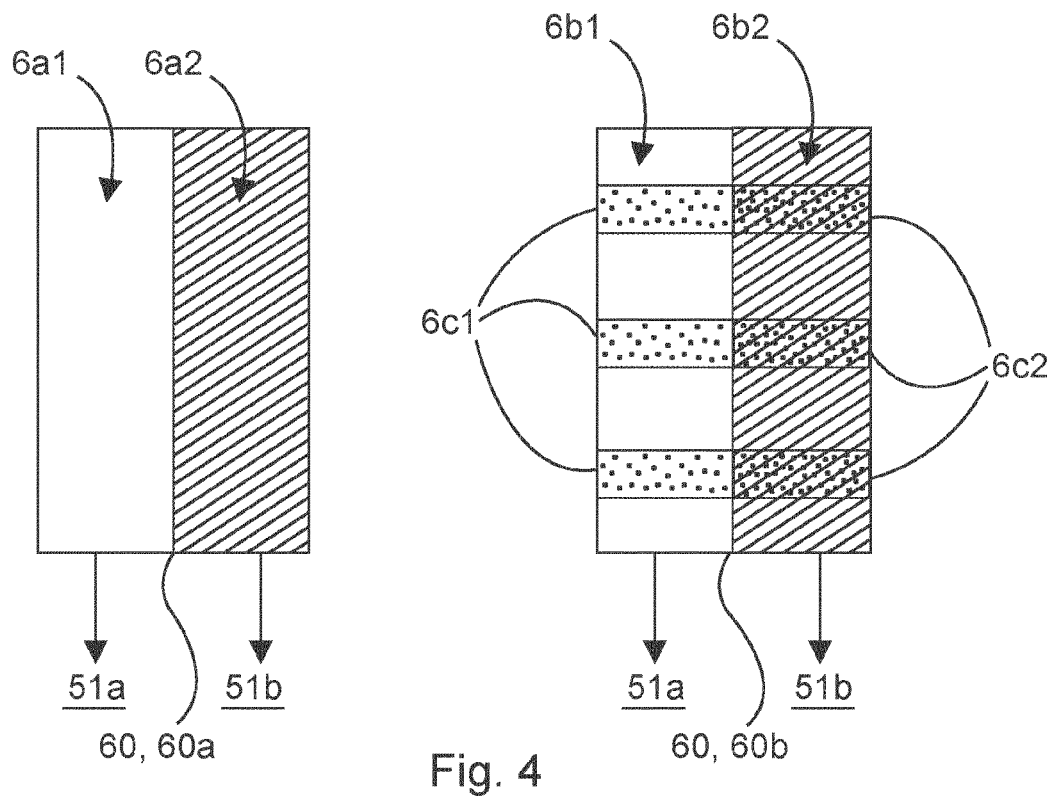
Figure 5:
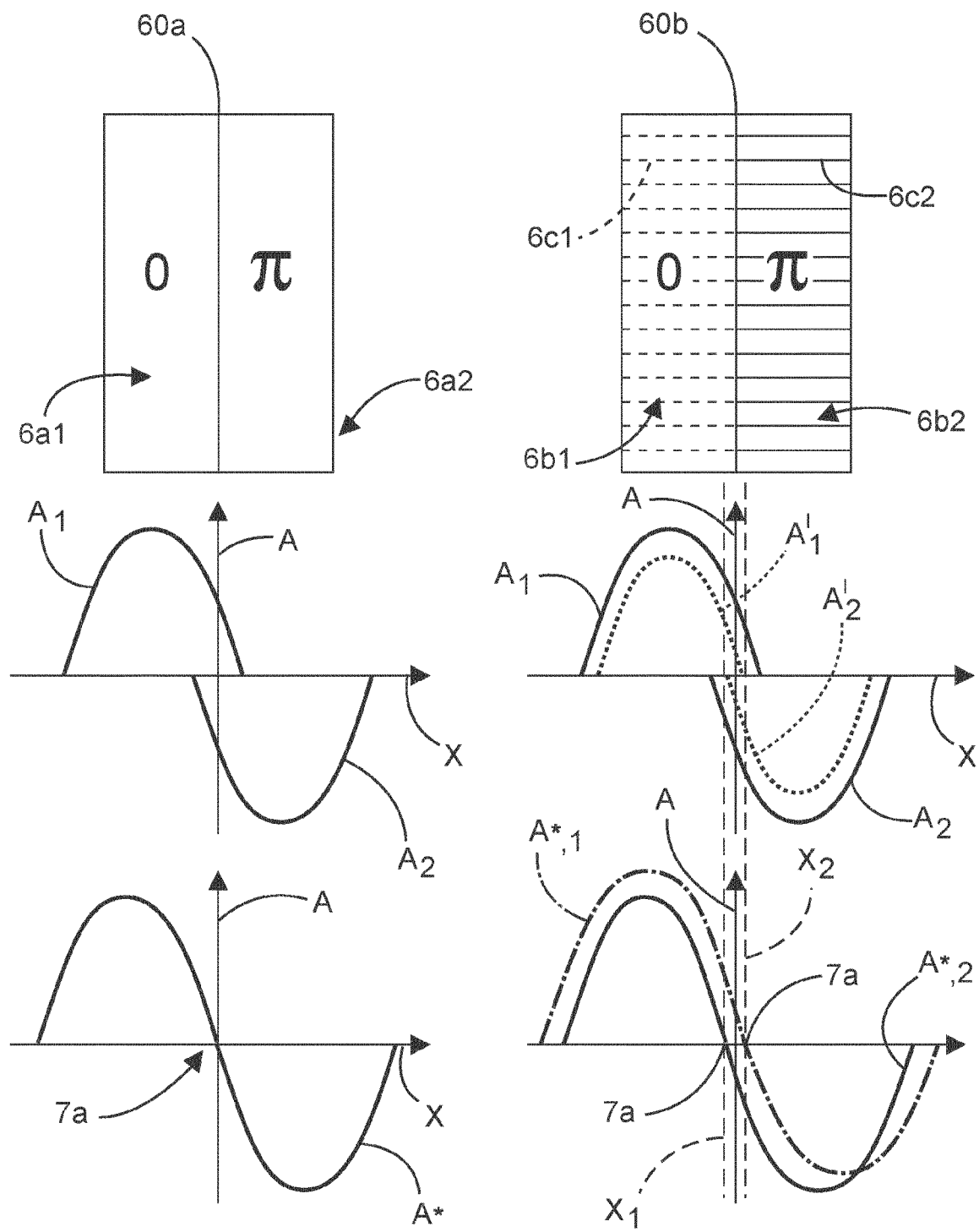
Figure 6:
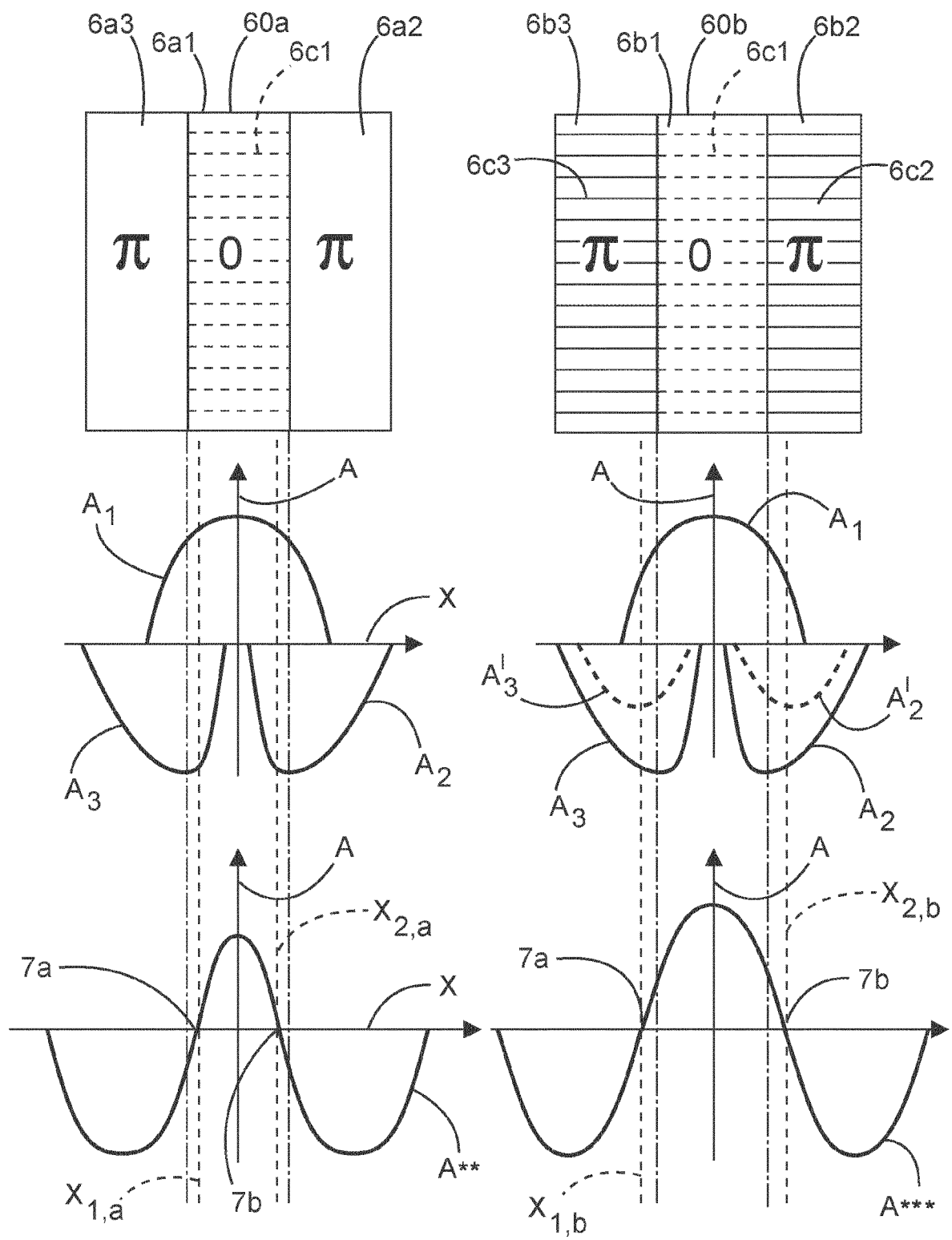
Figure 7:
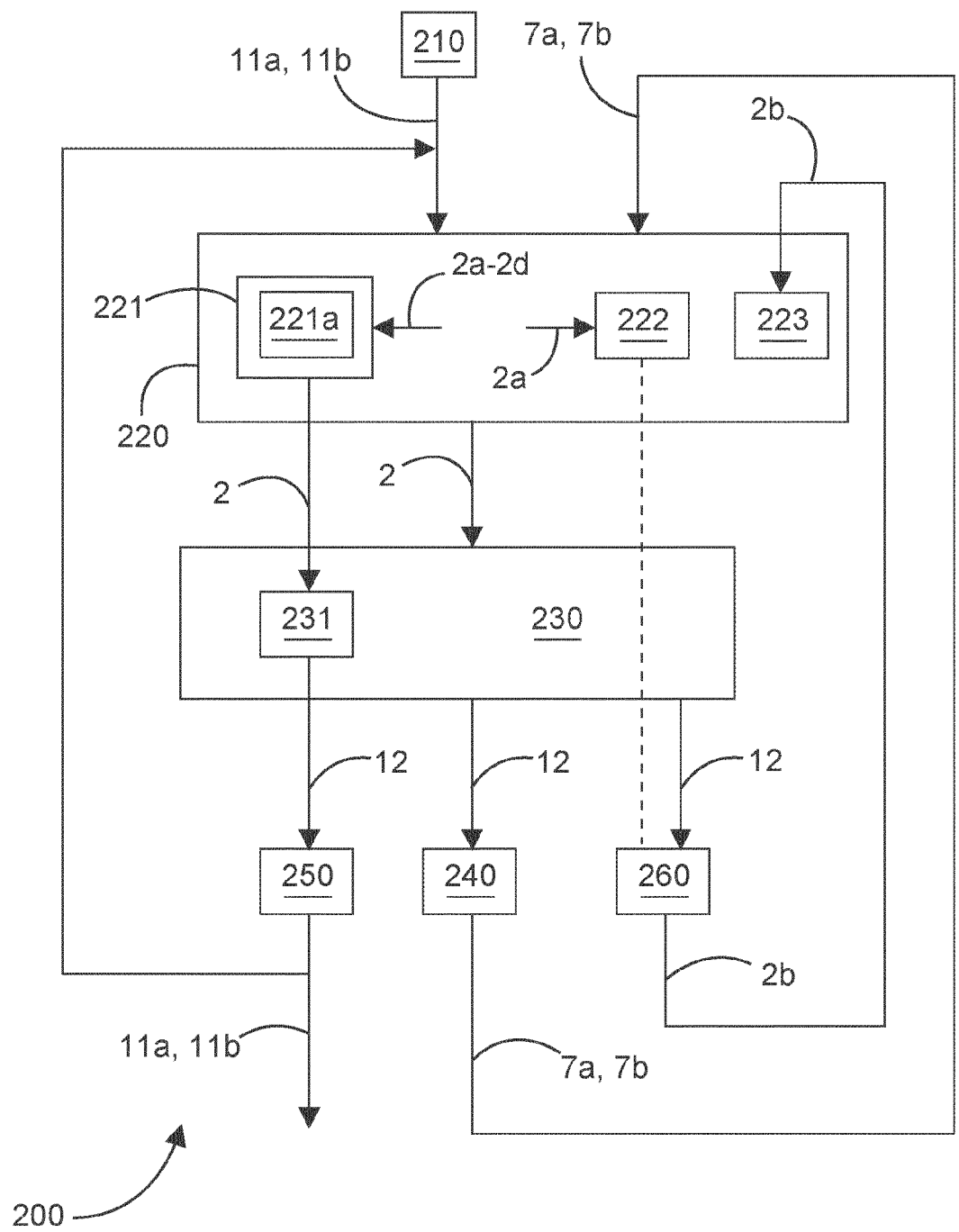
Figure 8:
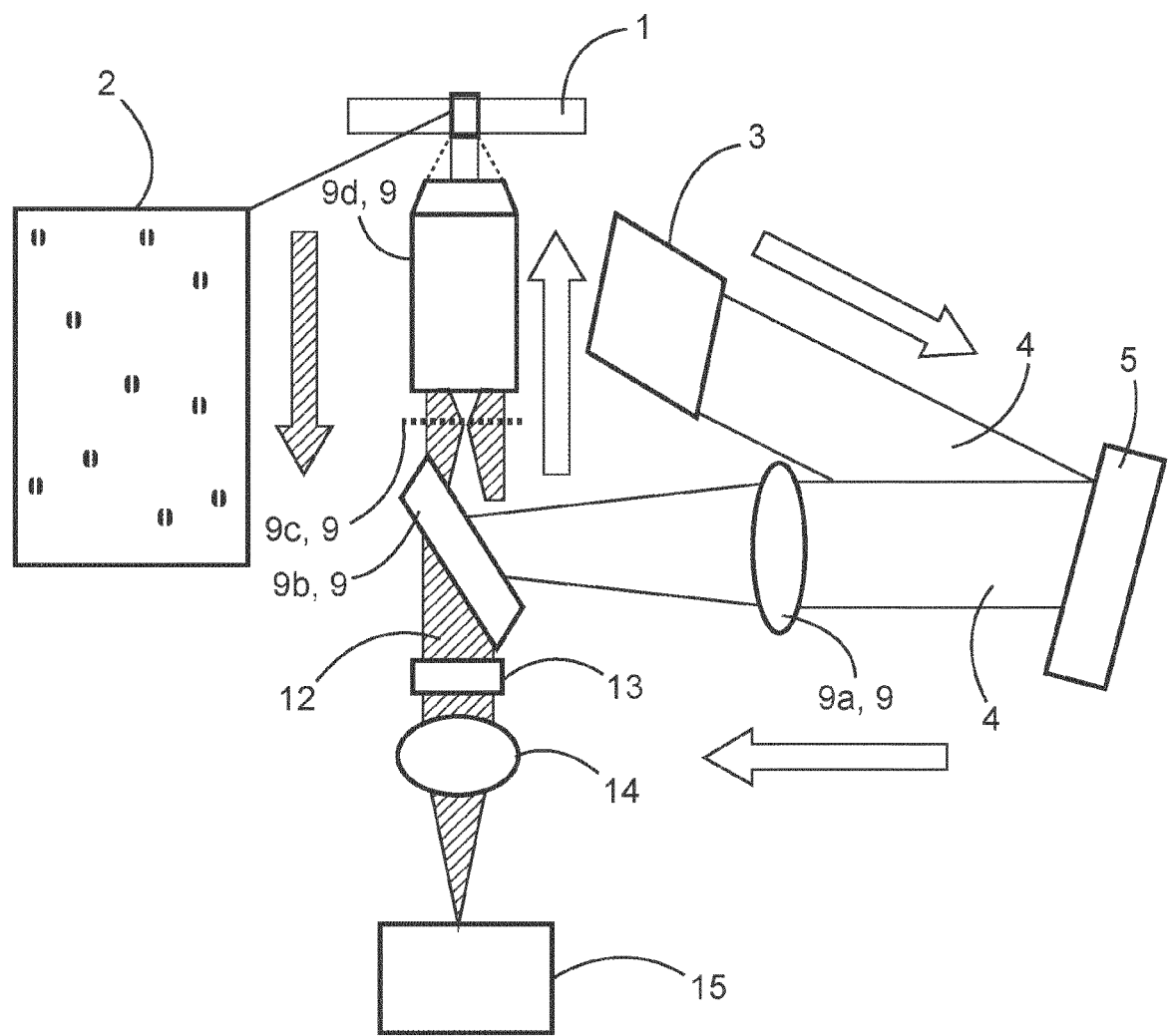

The subject matter of the invention will now be explained below on the basis of figures without this limiting the subject matter of the invention. In detail:

FIG. 1: shows an exemplary embodiment of the method 100;

FIG. 2: shows the generation of the zeros 7a, 7b by phase changes $\Delta\varphi_a$, $\Delta\varphi_b$;

FIG. 3: shows the superposition of a blocking control pattern 6e with zero control patterns 6 from a plurality of zero control sub-patterns 60;

FIG. 4: shows exemplary zero control patterns 6a and 6b with zero control sub-patterns 60a, 60b, which in turn contain control sub-sub-patterns 6a1, 6a2 and 6b1, 6b2, respectively;

FIG. 5: shows an illustration of the shift of a zero 7a by changing a control sub-sub-pattern 6b1, 6b2;

FIG. 6: shows an illustration of the shift of two zeros by changing control sub-sub-patterns 6b2, 6b3;

FIG. 7: shows an exemplary embodiment of the method 200;

FIG. 8: shows an exemplary apparatus for carrying out the method 200.

FIG. 1 shows a schematic flowchart of an exemplary embodiment of the method 100 for generating a light field 2 in a given work region 1. The light 4 from a light source 3 is supplied to at least one modulator 5 in step 110. According to Block 111, this modulator 5 may comprise a controllable active surface 51, which impresses phase changes $\Delta\varphi_a$, $\Delta\varphi_b$ on light components 4a, 4b of the light 4. The effect of the modulator 5 is represented in detail in FIG. 2. The entire optical setup is depicted in more detail in FIG. 8.

In step 120, the modulator 5 is controlled by a zero control pattern 6, 6a, 6b, in such a way that the summation of the amplitude distributions of the light components 4a, 4b guided via the modulator has zeros 7a, 7b at at least two positions that a specifiable independently of one another in the work region 1. In this case, each zero adjoins a respective region 8a, 8b, in which this summation of the amplitude distributions differs from zero. This is likewise represented in more detail in FIG. 2.

In step 130, the light 4 is guided from the modulator 5 into the work region 1 and forms the light field 2 there.

A plurality of exemplary configurations for controlling the modulator 5 are specified within the box 120.

According to Block 121, adjoining regions 51a, 51b of the active surface 51 of the modulator 5, which may correspond to control sub-sub-patterns 6a1, 6a2; 6b1, 6b2, can be controlled in such a way that, between the light components on which these regions 51a, 51b respectively act, a mean phase shift of 1 is set for the light leaving these regions 51a, 51b. In a specific embodiment, the zero control sub-pattern, composed of control sub-sub-patterns, are referred to as "phase boxes". Their effect is explained in more detail in FIG. 2.

According to block 122, the modulator 5 is controlled using a first zero control pattern 6a, for example consisting of at least two (possibly differently designed) zero control sub-patterns 60, at a first time and at least one second zero control pattern 6b, for example consisting of at least two (possibly differently designed) zero control sub-patterns 60, and a second, later time In this case, the at least two zero control patterns 6a, 6b differ to the effect of the position of at least one zero 7a, 7b changing in the work region 1 by a smaller absolute value than the change that would arise from the translation of the first zero control pattern 6a by one pixel 52 on an active surface 51 of the modulator 5 that is subdivided into pixels 52. Thus, the zero 7a, 7b can be shifted by sub-pixel absolute values in the work region 1. An exemplary subdivision of the active surface 51 into pixels 52 is shown in FIG. 2.

According to Block 123, a parameterized formulation 6d is set up 123 for the zero control pattern 6. According to Block 124, the parameters 6d' of this formulation 6d can be optimized with the target that the zeros 7a, 7b are exactly at the desired positions.

According to block 125, the modulator can be controlled by a superposition of, firstly, the zero control pattern 6, 6a, 6b and, secondly, a blocking control pattern 6e. The blocking control pattern 6e would on its own substantially keep the light 4 guided via the modulator 5 away from the work region 1; this blockade is lifted at the sites where the zero control pattern 6, 6a, 6b acts. The superposition according to block 125 is sketched out in FIG. 3.

According to block 126, at least one zero control sub-pattern 60 can be composed of the superposition of at least two control sub-sub-patterns 6a1, 6a2 or 6b1, 6b2 or composed in any other way. According to block 127, the light influenced by each of these control sub-sub-patterns 6a1, 6a2 or 6b1, 6b2 then in each case generates a complex amplitude $A_1$, $A_2$ at the specified location of at least one zero 7a, 7b. In this case, the control sub-sub-patterns 6a1, 6a2 or 6b1, 6b2 are chosen in such a way according to block 128 that the superposition A* of these complex amplitudes $A_1$, $A_2$ at the specified location of the zero 7a, 7b) yields 128 zero (or a value close to zero). In detail, this is elaborated on in FIG. 5. In this context, the reference sign A* should not be misunderstood to mean a "complex conjugation" in the mathematical sense.

Within box 130, various configurations are specified to the effect of how, in detail, the light 4 can be guided from the modulator 5 to the work region 1 in order to form the light field 2 there.

According to block 131, the light can be low-pass filtered in the spatial frequency domain between the modulator 5 and the work region 1.

According to block 132, the modulator 5 can be illuminated by the light source 3 at an oblique angle and can be controlled 132 so that the light components 4 whose phase is not changed by a zero control pattern 6, 6a, 6b are substantially kept away from the work region 1.

According to block 133, an optical plane in which the modulator is arranged can be imaged with reduced size onto the work region 1 or onto any other optical plane by means of an optical system 9.

According to block 134, the work region 1 and the modulator 5 can be arranged at optically conjugate positions and/or in optically conjugate planes.

According to block 135, the modulator 5 can be arranged in a Fourier plane.

According to block 136, the modulator 5 can be arranged in any desired optical plane.

According to block 137, additional modulators 5 and/or at least two parts of one modulator can be used in different optical planes.

According to block 138, one or more modulators and/or at least two parts of one modulator can be used in different optical planes in combination with at least one additional optical element.

FIG. 2 illustrates that generation of a zero 7a, 7b by means of at least one zero control sub-pattern 60 by way of the modulator 5 on the basis of a simplified sketched-out setup. For clarity, the setup is drawn in transmission even though commercially available modulators 5 that are operated in reflection typically provide better results.

A light source 3 radiates light 4 onto the modulator 5. The active surface of 51 of the modulator 5 is subdivided into pixels 52 which are individually controllable and which, depending on how they are controlled, impress a certain phase change $\Delta_\varphi$ on the light incident on said respective pixel 52. In the state shown in FIG. 2, the modulator 5 is controlled by the zero control sub-pattern 60 such that two adjoining regions 51a and 51b are created on the active surface 51. For illustrative purposes, FIG. 2 shows a zero control sub-pattern 60 which generates only a single zero 7a, 7b.

A phase change $\Delta\varphi_a$ is impressed on the light component 4a incident on the region 51a. A phase change $\Delta\varphi_b$ is impressed on the light component 4b incident on the region 51b. The phase changes $\Delta\varphi_a$ and $\Delta\varphi_b$ differ by t. For the sake of clarity, FIG. 2 plots only one arrangement made of regions 51a and 51b.

The light components 4a and 4b are guided from the modulator 5 through an optical imaging system 9 to the work region 1, where they form the light field 2. The symbol used to this end in FIG. 2 should not be misunderstood to the effect of a single lens generally sufficing as an optically imaging system 9. Each region 51a and 51b generates on its own an amplitude distribution $A_1$ and $A_2$ with a value that differs from zero at the desired zero; however, at said locations, the absolute values are the same but the signs differ so that in the summation a zero arises there. The zero 7a, surrounded by a region 8a, 8b with a non-zero intensity, forms in the light field 2 for each arrangement of regions 51*a* and 51*b* on the active surface 51. The preferred use of these zeros is the localization and/or tracking of point emitters 11 in the work region 1.

As mentioned previously, FIG. 3 shows the superposition of the blocking control pattern 6*e* (in this case a regular grating made of horizontal lines) and a zero control pattern 6. The zero control pattern 6 comprises a plurality of zero control sub-patterns 60 in the style of the zero control sub-patterns 60 used according to FIG. 2. This superposition can be switched onto the active surface 51 of the modulator 5.

FIG. 4 shows two exemplary zero control sub-patterns 60*a* and 60*b*, which belong to two different zero control patterns 6*a* and 6*b*, respectively. Both the zero control sub-patterns 60*a* and 60*b* respectively contain two control sub-sub-patterns 6*a*1 and 6*a*2, and 6*b*1 and 6*b*2, which for example can be switched on adjoining regions 51*a* and 51*b* on the active surface 51 of the modulator 5.

In the zero control sub-pattern 6*a*, the second control sub-sub-pattern 6*a*2 brings about a phase change of π the affected light by in comparison with the first control sub-sub-pattern 6*a*1. The light modulated according to the two control sub-sub-patterns 6*a*1 and 6*a*2 overlays at the location of the zero 7*a* to form a complex amplitude of zero.

The zero control sub-pattern 60*b* has been modified in relation to the zero control sub-pattern 60*a* by virtue of the fact that the two control sub-sub-patterns 6*b*1 and 6*b*2 now each contain a component 6*c*1, 6*c*2 that is periodic in the plane of the active surface 51. This influences the amplitudes, generated by the control sub-sub-patterns 6*b*1 and 6*b*2, at the specified location of the zero. FIG. 5 explains in more detail how the position of the zero 7*a* can be shifted in this case.

FIG. 5 schematically illustrates how the position of the zero 7*a* can be shifted by changing the amplitude by means of control sub-sub-patterns 6*a*1, 6*a*2; 6*b*1, 6*b*2. For reasons of simplicity, only a shift along one coordinate direction x is shown here.

Below the zero control sub-pattern 6*a* already known from FIG. 4, the complex amplitudes $A_1$ and $A_2$ generated in the work region 1 by the light respectively influenced by the control sub-sub-patterns 6*a*1 and 6*a*2 are plotted as a function of the coordinate x. The superposition A* of these complex amplitudes $A_1$ and $A_2$ has a zero 7*a* on the A-axis.

Diagrams corresponding thereto are plotted below the zero control sub-pattern 6*b*, which is likewise already known from FIG. 4. In the example shown in FIG. 5, the addition of the periodic component 6*c*2 of the second zero control sub-sub-pattern 6*b*2 modifies the complex amplitude $A_2$ of the light which is influenced by the second zero control sub-sub-pattern 6*b*2 to exhibit a new profile $A'_2$, which essentially only differs from the earlier profile $A_2$ in terms of amplitude. Accordingly, the complex amplitude A* of the superposition also changes to a new profile $A^*_{,1} = A_1 + A'_2$, the zero 7*a* of which is no longer on the A-axis but at a new position $x_2$.

However, instead of the periodic component 6*c*2 of the second zero control sub-sub-pattern 6*b*2, it is for example also possible to add the periodic component 6*c*1 of the first zero control sub-sub-pattern 6*b*1. Should this happen, the complex amplitude $A_1$ of the light influenced by the first zero control sub-sub-pattern 6*b*1 is modified to a new profile $A'_1$, which essentially only differs from the earlier profile $A_1$ in terms of the amplitude. This shifts the zero 7*a* of the new profile $A^*_{,2} = A'_1 + A_2$ to the left, from the A-axis to the new position $x_1$.

FIG. 6 schematically illustrates how two zeros 7*a*, 7*b* can be generated using one zero control sub-pattern 60*a*, 60*b*. Additionally, FIG. 6 schematically illustrates how the positions of the two zeros 7*a*, 7*b*, which were generated using one zero control sub-pattern 60*a*, 60*b*, can be shifted by changing the amplitude by means of the control sub-sub-patterns 6*a*1, 6*a*2, 6*a*3; 6*b*1, 6*b*2, 6*b*3. For reasons of simplicity, only a shift along one coordinate direction x is shown here.

The zero control sub-patterns 60*a*, 60*b* shown in FIG. 6 differ from the zero control sub-patterns 60*a*, 60*b* shown in FIG. 5 by virtue of the fact that a third zero control sub-sub-pattern 6*a*3 and 6*b*3, respectively, was additionally added. Accordingly, there are three complex amplitudes $A_1$, $A_2$ and $A_3$ which overlay to form a resultant complex amplitude A**.

For the zero control sub-pattern 60*a*, the first zero 7*a* is at the position $x_{1,a}$, where $A_1$ overlaid $A_3$ with yields zero or virtually zero. The second zero 7*b* is at the position $x_{2,a}$, where $A_1$ overlaid $A_2$ with yields zero or virtually zero.

The zero control sub-pattern 60*b* now differs from the zero control sub-pattern 60*a* by virtue of the fact that the control sub-sub-patterns 6*b*2 and 6*b*3 have received the same periodic components 6*c*2 and 6*c*3. As a result, the amplitude $A_2$ is modified to a profile $A'_2$ and the amplitude $A_3$ is modified to a profile $A'_3$. Thus, the amplitudes $A_1$, $A'_2$ and $A^{3'}$ are overlaid to form the resultant complex amplitude A*. This complex amplitude A* has a first zero 7*a* at the position $x_{1,b}$, where $A_1$ overlaid with $A_3$ yields zero or virtually zero, and a second zero 7*b* at the position $x_{2,b}$, where $A_1$ overlaid with $A'_2$ yields zero or virtually zero.

FIG. 7 shows a schematic flowchart of an exemplary embodiment of the method 200 for subjecting a work region 1 containing point emitters 11 to a light field 2. In step 210, positions 11*a*, 11 *b*, at which the point emitters 11 are located, are obtained at least approximately using any desired method. In step 220, the work region 1 is subjected to a light field 2 having zeros 7*a*, 7*b* at the obtained positions 11*a*, 11 *b* using the above-described method 100.

The light field 2 excites the point emitters 11 to emit secondary light 12. This secondary light is measured in step 230. In step 240, the positions at which the zeros 7*a*, 7*b* of the light field 2 are located are actively regulated such that the intensity of the secondary light 12 adopts a minimum or the minimum is deliberately located in the direct vicinity thereof. The positions of the zeros 7*a*, 7*b* then serve as point emitter positions.

According to block 221, the work region 1 can be subjected 221 to a plurality of light fields 2*a*-2*d*, which each have zeros at different positions. According to block 231, the intensity of the secondary light and/or the spatial distribution of this intensity can then be measured for each of these light fields 2*a*-2*d*. In step 250, the position 11*a*, 11*b* of at least one point emitter 11 in the work region 1 can be evaluated from the measurements. Provided at least four light fields 2*a*-2*d* are chosen in block 221*a* and the union of the positions of zeros from all light fields 7*a*, 7*b* extend over three spatial directions X, Y, Z, the position 11*a*, 11*b* of the at least one point emitter 11 can also be determined in three dimensions. In particular, the approximate value of this position 11*a*, 11*b* originally introduced in step 210 can be refined in this way. The determined position 11*a*, 11*b* can also be restored into the method 200 as a new approximate value in order to continually track the at least one point emitter.

According to block 222, the work region 1 can initially be subjected to a first light field 2*a*, and a second light field 2*b* which promises a maximum information gain in view of a specified target can be determined in step 260 after the intensity of the secondary light 12 and/or the spatial distribution of this intensity was measured 230. Then, according to block 223, the work region can also be subjected to this second light field 2b.

FIG. 8 shows an exemplary setup for carrying out the method 200. In contrast to FIG. 2, the modulator 5 is operated in reflection here, and the imaging optical system 9 between modulator 5 and work region 1 is more complex. In this case, the optical system 9 comprises a lens 9a, a semi-transparent dichroic means 9b, a Fourier mask 9c, and an objective 9d. The light field 2 generated therewith in the work region 1 is of the type sketched out in FIG. 2.

The setup is shown in FIG. 8 allows secondary light 12 emitted by point emitters 11 in the work region 1 to be guided downward in a straight line, through an emission filter 13 and a tube lens 14, and into a detector 15.

LIST OF REFERENCE SIGNS

1 Work region
2, 2a-2d Light field in the work region 1
3 Light source
4 Light
4a, 4b Modulated components of the light 4
5 Modulator
51 Active surface of the modulator 5
51a, 51b Adjoining regions on the active surface 51
52 Pixels of the active surface 51
6, 6a, 6b Zero control pattern
60 Zero control sub-pattern, as a building block of the pattern 6
60a Zero control sub-pattern, belonging to pattern 6a
60b Zero control sub-pattern, belonging to pattern 6b
6a1-6a3 Zero control sub-sub-pattern of the pattern 6a
6b1-6b3 Zero control sub-sub-pattern of the pattern 6b
6c1-6c3 Periodic components of the sub-sub-patterns 6a1-6a3; 6b1-6b3
6d Parameterized formulation for the zero control pattern 6
6d' Parameter of the formulation 6d
6e Blocking control pattern
7a, 7b Zeros
8a, 8b Regions with a non-zero intensity around the zeros 7a, 7b
9 Imaging optical system between modulator 5 and region 1
9a Lens
9b Dichroic means
9c Fourier mask
9d Objective
11 Point emitter
11a-11b Positions of the point emitters 11
12 Secondary light emitted by point emitters 11
13 Emission filter
14 Tube lens
15 Detector
100 Method for generating the light field 2 in the region 1
110 Supplying the light 4 to the modulator 5
111 Choosing a modulator 5 with an active surface 51
120 Controlling the modulator 5 with the zero control pattern 6
121 Controlling regions 51a, 51b with phase difference 1L
122 Alternating between zero control sub-patterns 6a and 6b
123 Setting up the parameterized formulation 6d
124 Optimizing the parameters 6d'
125 Controlling with the blocking control pattern 6e
126 Forming the pattern 60 from control sub-sub-patterns 6a1, 6a2; 6b1, 6b2
127 Generating complex amplitudes $A_1$, $A_2$
128 Choosing the patterns 6a1, 6a2; 6b1, 6b2 for positioning the zeros
130 Guiding the light 4 from the modulator 5 into the region 1
131 Low-pass filtering of the light 4
132 Obliquely illuminating the modulator 5
133 Size-reducing imaging with the optical system 9
134 Arranging region 1 and modulator 5 in conjugate planes
135 Arranging the modulator in a Fourier plane
136 Arranging the modulator in any desired optical plane
137 Arranging modulators in different optical planes
138 Arranging 137 in conjunction with optical elements
200 Method for exciting and/or tracking point emitters 11
210 Determining approximate positions 11a of the point emitters 11
220 Subjecting region 1 to the light field 2
221 Choosing a plurality of light fields 2a-2d
221a Choosing at least four light fields 2a-2d
222 Choosing a first light field 2a
223 Choosing the new light field 2b
230 Measuring the secondary light 12
231 Carrying out a separate measurement 230 for each light field 2a-2d
240 Regulating the positions of the zeros 7a, 7b
250 Evaluating the position 11a, 11b of the point emitter 11
260 Determining a new light field 2b after gaining information
A Complex amplitude
$A_1$ Complex amplitude of the light influenced by the pattern 6a1, 6b1
$A_2$ Complex amplitude of the light influenced by the pattern 6a2, 6b2
$A_3$ Complex amplitude of the light influenced by the pattern 6a3, 6b3
$A_2'$ Change in the complex amplitude $A_2$ due to periodic component 6c2
$A_3'$ Change in the complex amplitude $A_3$ due to periodic component 6c3
A* Superposition of the complex amplitudes $A_1$, $A_2$
A** Superposition of the complex amplitudes $A_1$, $A_2$, $A_3$
A*** Superposition of the complex amplitudes $A_1$, $A_2'$, $A_3'$
$A^*_1$ Change in the superposition A* due to periodic component 6c1
$A^*_2$ Change in the superposition A* due to periodic component 6c2
$\Delta\varphi_a$, $\Delta\varphi_b$ Phase changes that can be brought about by regions 51a, 51b
x Coordinates direction
$x_1$, $x_2$ Positions of a single zero 7a
$x_{1,a}$, $x_{2,a}$ Positions of two zeros 7a, 8a, brought about by pattern 60a
$x_{1,b}$, $x_{2,b}$ Positions of two zeros 7b, 7b, brought about by pattern 60b

The invention claimed is:
1. A method for generating a light field in a specified work region using an at least partly coherent light source, comprising:

providing light from the light source to at least one modulator which impresses different changes in at least one property of the light on different components of the light;

controlling the at least one modulator by a zero control pattern such that the summation of the amplitude distributions of the light components, which were guided via the modulator, have zeros at at least two positions that are specifiable independently of one another within the specified work region, wherein the zeros each adjoins regions in which this summation of the amplitude distributions differs from zero; and guiding the light from the at least one modulator into the specified work region.

2. The method according to claim 1, wherein the modulator includes a plane active surface, the at least one modulator being designed to impress phase changes on the light components which at least one of (i) pass through the plane active surface, or (ii) are reflected by the plane active surface.

3. The method according to claim 2, wherein at least two adjoining regions of the plane active surface are controlled such that, between the light components on which the plane active regions respectively act, a mean phase shift of π is set for the light leaving the plane active regions.

4. The method according to claim 2, wherein the plane active surface of the at least one modulator is subdivided into pixels which are controllable separately from one another.

5. The method according to claim 4, wherein the at least one modulator is controlled using a first zero control pattern at (i) a first time and at least one second zero control pattern and (ii) a second subsequent time, and wherein at least two zero control patterns differs to the effect of the position of at least one zero changing in the specified work region by a smaller absolute value than the change that would arise from a translation of the first one of the zero control patterns by one pixel on the plane active surface of the at least one modulator.

6. The method according to claim 1, wherein the zero control pattern comprises a plurality of zero control sub-patterns each of which generates an independent zero due to the light respectively influenced by the zero control sub-patterns being influenced in different ways.

7. The method according to claim 6, wherein
at least one of the zero control sub-patterns is composed of at least two control sub-sub-patterns,
the light influenced by each of the control sub-sub-patterns in each case generates a complex amplitude at a specified location of at least one zero, and
the control sub-sub-patterns is chosen in such a way that a superposition of the complex amplitude at the specified location of the at least one zero yields zero or a minimum in terms of an absolute value that is near zero.

8. The method according to claim 7, wherein
at least one of the zero control sub-patterns is composed of at least three control sub-sub-patterns,
the light influenced by each of the control sub-sub-patterns in each case generates a complex amplitude at a specified location of at least one zero, and
the control sub-sub-patterns is chosen in such a way that a superposition of the complex amplitude generates at least two zeros in the specified work region.

9. The method according to claim 7, wherein at least one of the control sub-sub-patterns contains an additional control element in the plane of the active surface, the additional control element being suitable for influencing the complex amplitude, generated by the at least one of the control sub-sub-pattern, at the specified location of the zero.

10. The method according to claim 1, further comprising setting up a parameterized formulation for the zero control pattern, wherein parameters of the formulation are optimized so that the summation of the amplitude of distributions of the light components guided via the at least one modulator have zeros at the at least two positions.

11. The method according to claim 1, wherein the modulator is controlled by a superposition of a blocking control pattern which substantially keeps the light guided via the at least one modulator away from the specified work region and the zero control pattern.

12. The method according to claim 1, wherein the light between the at least one modulator and the specified work region is low-pass-filtered in a spatial frequency domain.

13. The method according to claim 1, wherein the at least one modulator is illuminated by the light source at an oblique angle and is controlled such that the light components whose phase is unchanged by the zero control pattern are substantially kept at a distance from the specified work region.

14. The method according to claim 1, wherein the light is modulated in a plurality of different optical planes.

15. The method according to claim 1, wherein an optical plane in which the at least one modulator is arranged is imaged with a reduced size onto the specified work region or onto a further optical plane using an optical system.

16. The method according to claim 1, wherein the specified work region and the at least one modulator are arranged at least one of (i) at optically conjugate positions, or (ii) in optically conjugate planes.

17. The method according to claim 1, wherein the at least one modulator is arranged in a Fourier plane.

18. A method for subjecting a work region containing point emitters to a light field, comprising:
at least approximately obtaining at least two positions at which point emitters are located in the work region; and
subjecting the work region to the light field having zeros at the at least two obtained positions by:
providing light from a light source to at least one modulator which impresses different changes in at least one property of the light on different components of the light;
controlling the at least one modulator by a zero control pattern such that the summation of the amplitude distributions of the light components, which were guided via the modulator, have zeros at the at least two obtained positions that are specifiable independently of one another within the work region, wherein the zeros each adjoins regions in which this summation of the amplitude distributions differs from zero; and
guiding the light from the at least one modulator into the work region.

19. The method according to claim 18, further comprising measuring an intensity of a secondary light emitted by the point emitters in response to an excitation by the light field.

20. The method according to claim 19, further comprising actively regulating the positions at which the zeros of the light field are located such that the intensity of the secondary light adopts a minimum or the minimum is deliberately located in a direct vicinity thereof.

21. The method according to claim 19, wherein:
the work region is subjected to a plurality of light field each having zeros at different positions, at least one of the intensity of the secondary light or a spatial distribution of the intensity is measured for each of the light fields, and the respective position of at least one of the point emitters in the work region is evaluated based on the measurements.

22. The method according to claim 21, further comprising selecting at least four light fields, wherein a union of the positions of zeros from all of the light fields extends in three spatial directions.

23. The method according to claim 19, wherein the work region is subjected to a first light field, a second light field which promises a maximum information gain in view of a specified target is determined after at least one of the intensity of the secondary light or a spatial distribution of the intensity is measured, and the work region is subjected to the second light field.

* * * * *

UNITED STATES PATENT AND TRADEMARK OFFICE
CERTIFICATE OF CORRECTION

Page 1 of 1

PATENT NO. : 11,885,948 B2
APPLICATION NO. : 17/787738
DATED : June 21, 2022
INVENTOR(S) : Rainer Heintzmann and Alexander Jügler It is certified that error appears in the above-identified patent and that said Letters Patent is hereby corrected as shown below:

On the Title Page

Correct the spelling of the (71) Applicant under Column 1, Lines 4-5, and the (73) Assignee under Column 1, Lines 10-11, as follows:

(71) Applicant: Leibniz-Institute für Photonische Technologien e.V.

(73) Assignee: Leibniz-Institute für Photonische Technologien e.V.

Signed and Sealed this
Fourth Day of March, 2025

Coke Morgan Stewart
*Acting Director of the United States Patent and Trademark Office*